US006522651B2

(12) United States Patent
Herrmann

(10) Patent No.: US 6,522,651 B2
(45) Date of Patent: *Feb. 18, 2003

(54) METHOD OF ENCAPSULATION OF DATA INTO TRANSPORT PACKETS OF CONSTANT SIZE

(75) Inventor: Laurent Herrmann, Le Kremlin-Bicetre (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 09/174,787

(22) Filed: Oct. 19, 1998

(65) Prior Publication Data

US 2002/0003811 A1 Jan. 10, 2002

(30) Foreign Application Priority Data

Oct. 17, 1997 (EP) .............................. 97402460

(51) Int. Cl.$^7$ ............................................. H04L 12/56
(52) U.S. Cl. ............................. 370/395.2; 370/395.64; 370/471; 370/476
(58) Field of Search .................. 370/395, 419, 370/420, 465, 466, 469–476, 487, 493; 348/6, 7, 10, 12, 13; 455/2–5.1, 395.1, 395.64

(56) References Cited

U.S. PATENT DOCUMENTS

| 5,437,027 A | * | 7/1995 | Bannon et al. ............. 707/103 |
| 5,537,408 A | * | 7/1996 | Branstad et al. ............ 370/473 |
| 5,659,539 A | * | 8/1997 | Porter et al. ................ 709/231 |
| 5,742,599 A | * | 4/1998 | Lin et al. .................... 370/395 |
| 5,802,068 A | * | 9/1998 | Kudo .......................... 370/538 |
| 5,874,997 A | * | 2/1999 | Haigh ......................... 348/423 |
| 5,886,989 A | * | 3/1999 | Evans et al. ................ 370/347 |
| 6,079,566 A | * | 6/2000 | Eleftheriadis et al. ...... 207/101 |
| 6,111,845 A | * | 8/2000 | Shyu ..................... 369/124.08 |
| 6,111,858 A | * | 8/2000 | Greaves et al. ............. 370/256 |
| 6,151,319 A | * | 11/2000 | Dooety et al. .............. 370/395 |

FOREIGN PATENT DOCUMENTS

| EP | 0753954 A2 | 1/1997 |
| WO | 9728652 A2 | 8/1997 |
| WO | 9846024 A1 | 10/1998 |

OTHER PUBLICATIONS

ISO/IEC—MPEG–4 Systems, N1825, Jul. 25, 1997, by A. Eleftheriadis et al.

\* cited by examiner

Primary Examiner—Hassan Kizou
Assistant Examiner—Saba Tsegaye
(74) Attorney, Agent, or Firm—Russell Gross

(57) ABSTRACT

In order to interoperate with all types of transport networks working with packets of constant size, an encapsulation method is proposed to adapt multiplexed data, organized in successive, individually accessible portions, to these networks. Said data are segmented to fit the size of the network packets, and, for matching the last segment of said data to said constant size, a padding step is provided for adding a padding packet to each last segment.

2 Claims, 5 Drawing Sheets

METHOD OF ENCAPSULATION OF DATA INTO TRANSPORT PACKETS OF CONSTANT SIZE

BACKGROUND OF THE INVENTION

The invention relates to a method of encapsulation of data into network transport packets of constant size, said data being organized in successive, individually accessible portions of coded representations of audio-visual objects, and each of said portions being sub-divided into segments. This invention is particularly useful with networks such as MPEG-2 Transport Stream (MPEG-2 TS) and the Asynchronous Transfer Mode (ATM), for the encapsulation of MPEG-4 data into the transport packets of these networks.

The future MPEG-4 standard, which will be in force in January 1999, proposes standardized ways to represent audio-visual objects (called AVOs) of natural or synthetic origin, to compose them together to create compound AVOs that form audio-visual scenes, to multiplex and synchronize the data associated with these AVOs, and to interact with the audio-visual scenes generated at the receiver's end.

As shown in FIG. 1, described later in a more detailed manner, an MPEG-4 audio-visual scene, received by a system such as described for instance in the document "MPEG-4: Context and objectives", R. Koenen and al., Signal Processing: Image Communication 9 (1997), May 1997, n°4, pp.295–304, is generally composed of several AVOs organized in a hierarchical fashion. The leaves of this hierarchical organization are primitive AVOs such as: a background, the picture of a talking person, the voice associated with that person, and so on, of any type—text, graphics, . . . —and which may be either bi- or tridimensional (2D,3D).

The data associated with these AVOs are conveyed in one or more Elementary Streams (ESs), characterized by the quality of service (QoS) they require for transmission and some other parameters. The data streams, coming from a transmission network or a storage medium in the form of TransMux Streams, must be properly demultiplexed to recover the Elementary Streams. These Elementary Streams are then passed to the appropriate decoders in view of their decompression, and in order to reconstruct the original AVOs (Primitive AV Objects). Decoded AVOs, along with scene description indications giving information on the composition of the concerned scene, are then used to compose and render the scene as described by its author (in a given hierarchical form). Also to the extent allowed by the author, upstream data are sent back to the Network Layer in order to interact with the scene.

SUMMARY OF THE INVENTION

The Systems part of the MPEG-4 standard describes a system for communicating audiovisual information in the form of a coded representation of natural or synthetic objects (the media objects called AVOs hereabove). In such a system, at the sending side, this audiovisual information is indeed compressed, composed, and multiplexed in binary streams, and after the transmission, at the receiving side, these streams are demultiplexed, decompressed, composed, and presented to the terminal of the end user (who generally can interact with the presentation). The Elementary Streams conveying the data associated with the AVOs contain the coded representation of these data: scene description information, audiovisual information, content-related information, and other additional data. After transmission, the ESs are decoded, composed according to the scene description information (the composition being in fact defined as the process of applying scene description information in order to identify the spatio-temporal attributes of the media objects) and presented to the terminal, all these processes being synchronized according to the terminal decoding model (=Systems Decoder Model, or SDM) and the synchronization information.

The purpose of said SDM is to provide a view of the behavior of a terminal complying with the MPEG-4 standard: it is used by the sender to predict how the receiver will behave in terms of buffer management and synchronization when reconstructing the audiovisual information that composes the session. More precisely, an MPEG-4 terminal (such as depicted in FIG. 1) comprises a multi-layer structure consisting of a TransMux layer, a FlexMux layer and an Access Unit layer (this Layer Model provides a common model on which all implementations of MPEG-4 terminals can be based). The TransMux layer, which designates any existing or future underlying multiplex functionality that is suitable to transport MPEG-4 data streams (thus allowing MPEG-4 to be used in a wide variety of operation environments), is not defined in the context of MPEG-4: it is in fact an interface to the transmission network (for example, MPEG-2 TS or ATM) or the storage medium, that allows to offer transport services matching the requested quality of service. The FlexMux layer, completely specified by MPEG-4, consists of a flexible tool for interleaving data (one or more Elementary Streams into one FlexMux stream) and allows to identify the different channels for the data that have been multiplexed.

The Access Unit layer conveys both time base information and time stamped Access Units of the Elementary Streams and allows therefore for an identification of Access Units (video or audio frames, scene description commands, . . . ) in the Elementary Streams and a recovery of time base (an Access Unit—or AU—is the smallest individually accessible portion of the coded representation of an AVO within an Elementary Stream, to which timing information can be attributed). A compression layer processes the data (object descriptor, scene description information, primitive AV objects) allowing to carry out the composition and rendering steps of the concerned audiovisual interactive scene and the data corresponding to the interactive actions allowed by the return channel.

Moreover, the Elementary Streams are conveyed according to a packetized representation: the ESs data encapsulated into so-called SL-packetized streams are sent and/or received through a stream multiplex interface intended to encapsulate the demultiplexer of the SDM, to provide access to streaming data and to fill up decoding buffers with these data. An SL-packetized stream consists of a sequence of packets (according to the syntax and semantics defined in the standard) that encapsulate a single ES. The packets contain elementary stream data partitioned into the above-mentioned Access Units, as well as side information for timing and Access Unit labeling.

For a transmission of data, and especially of multimedia data of the MPEG-4 type over various networks, the format of the data has to be adapted to the format the network is able to work with. When adapting multiplexed packets to networks working with packets of constant size (such as MPEG-2 TS or ATM, as described hereinafter) in order to interoperate with these networks, it could unfortunately happen, even if the data is segmented to fit the size of these packets, that some segments are too small to fit this size. An object of the invention is therefore to propose a general method of adaptation of multiplexed data to networks working with packets of constant size. To this end the invention relates to a method such as described in the preamble of the description and which is moreover characterized in that it comprises, for matching the last segment of each portion to the constant size of the transport network, a padding step provided for adding a specific padding packet to each of said last segments. This technical solution has a particular interest when said data is multimedia data of the MPEG-4 type and each of said portions, called Access Unit or AU, is sub-divided into segments called Access Unit layer-Packet Data Units, or AL-PDUs. More particularly, said method is characterized in that the size of the padding packet of each successive portion is computed according to the following sub-steps:

the number of segments of each portion is detected and examined;
    if said number is greater than 1, each successive network packet of constant size is built by adding to each segment except the last one appropriate headers corresponding to the concerned transport network, and the size of the padding packet is then computed by difference between the size of the last segment and the size of the network packets and taking into account the values of said headers;
    if said number is not greater than 1, the size of the padding packet is computed by difference between the size of the single segment and the size of the network packets and taking into account the values of said headers;
    based on that size of the padding packet, the last complete network packet corresponding to said last or single segment is built.

BRIEF DESCRIPTION OF THE DRAWINGS

The particularities and advantages of the invention will now be explained in a more detailed manner in relation with the following description and the accompanying drawings, in which.

DETAILED DESCRIPTION OF THE PREFERRED EMBODIMENTS

Figure 1:
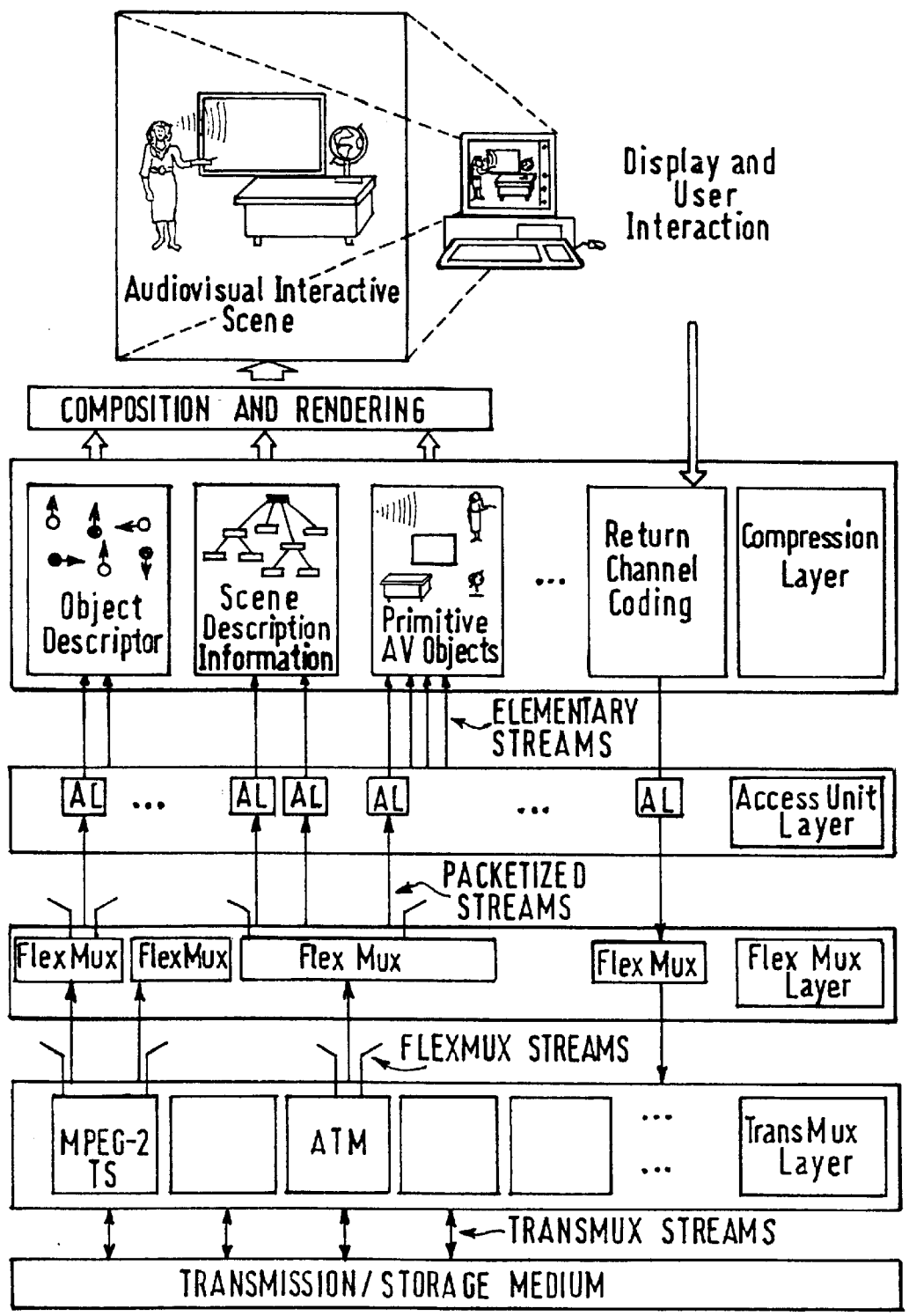
FIG. 1 shows an example of an MPEG-4 terminal allowing to construct an audiovisual interactive scene.
Figure 2:
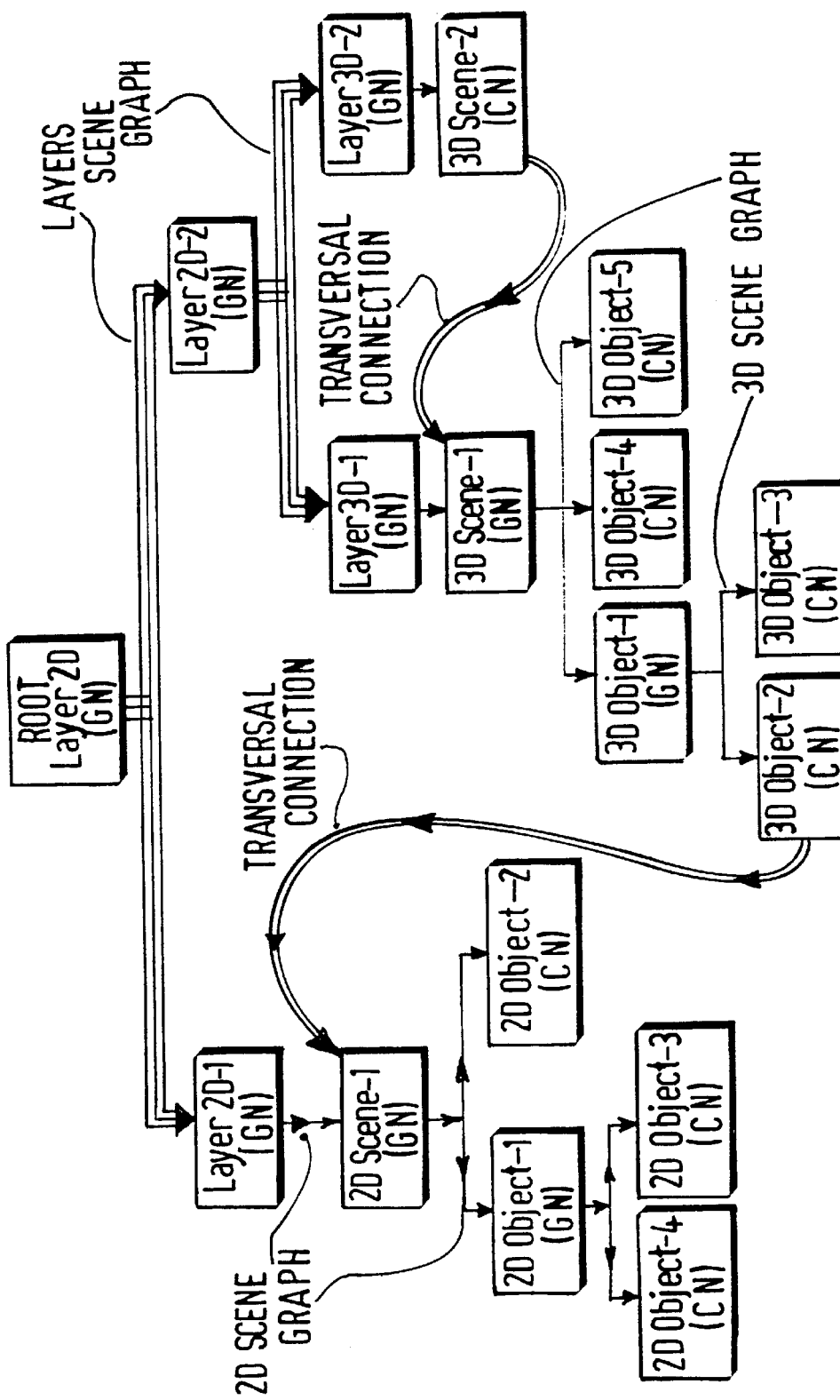
FIG. 2 illustrates an example of hierarchical representation of a scene.

In MPEG-2 standard, audio-visual data is encoded and transmitted. With the MPEG-4 standard, in order to reconstruct a multimedia scene at a terminal, one must convey a video and a synchronized audio channel: all objects are therefore multiplexed together in a whole single stream and transported to the terminal, where they are demultiplexed and composed in order to construct and present to the end user of said terminal a meaningful multimedia scene (as already said, an example of such a scene can be seen in the upper part of FIG. 1). A description of this complete scene is made thanks to a compact binary format (Binary Format for Scene, or BIFS) representing a predefined set of Scene Objects and behaviours along with their spatial-temporal relationship. The BIFS scene description consists of a collection of nodes describing the scene and its layout, as shown for instance in FIG. 2: this figure illustrates an example of a scene graph giving a hierarchical representation of a scene, according to a tree structure consisting of a hierarchy of layers organized in nodes (either in grouping nodes GN defining the hierarchical connections or in children nodes CN that are only the leaves of the tree), and, if necessary, in transversal connections between these nodes, allowing to organize any kind of transmission of data between all the objects of the scene. The data corresponding to said BIFS scene description are themselves conveyed to the terminal as an Elementary Stream, just as any media stream associated with the concerned scene. Some requirements are, obviously, attached to the BIFS elementary stream transport in view of an appropriate framing of the transported data and time stamping (a time stamp is an information unit related to time information in the stream).

According to the Systems part of the MPEG-4 standard, it has been seen that the Access Unit layer (or AL) adapts Elementary Stream data for the communication over the Stream Multiplex Interface, by conveying both time stamped Access Units and time base information (all consecutive data that refer to the same decoding time form a single Access Unit). The smallest protocol unit exchanged between AL entities is then a segment of Access Unit called Access Unit Layer Protocol Data Unit (AL-PDU) and consists of an AL-PDU header, useful for error detection and framing of the AL-PDU payload that follows, and the AL-PDU payload itself, which is the data field containing the Elementary Stream data.

Similarly, the smallest protocol unit of a FlexMux Stream exchanged between FlexMux entities is called FlexMux Protocol Data Unit (FM-PDU). As for AL-PDUs, it consists of an FM-PDU header (an information preceding the FM-PDU payload and identifying the FlexMux channel(s) which the payload of this FM-PDU belongs to) and the FM-PDU payload itself (the data field of the FM-PDU). One or more AL-PDUs are embedded into an FM-PDU according to a mode that is specified (simple mode, MuxCode mode)

In the following description, two examples of transmission, or transport networks defined with packets size of constant length are considered: MPEG-2 Transport Stream (MPEG-2 TS) and the Asynchronous Transfer Mode (ATM). MPEG-2 TS packets are 188 bytes long, including a header of 4 bytes and a payload of 184 bytes, while ATM cells are 53 bytes long, including a header of 5 bytes and a payload of 48 bytes. As the packet size is constant with these networks, there is a problem to fit the last segment of an Access Unit, in the case of MPEG-4 data. It is here proposed to use a padding mechanism in order to build the last part of the last segment to be transmitted over the network.

Figure 3:
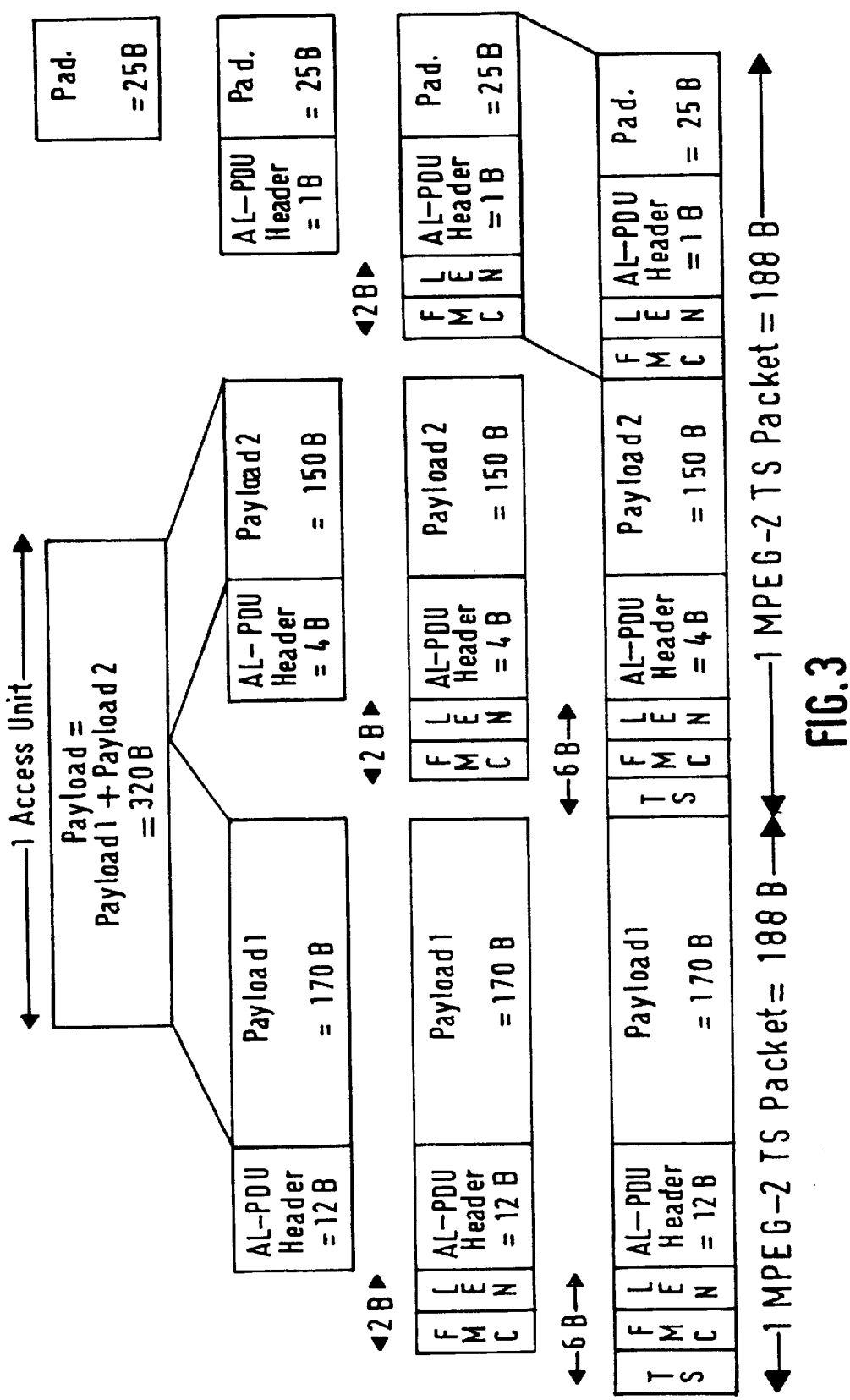
FIGS. 3 and 4 show a mechanism of encapsulation of MPEG-4 data according to the invention, respectively in the context of MPEG-2 TS and in the context of ATM.

It must be recalled that a mechanism of adaptation is provided by MPEG-2 Systems, according to which a so-called adaptation field allows data of different sizes to be encapsulated into MPEG-2 TS streams. This mechanism being very time consuming, it is chosen to do the adaptation at the MPEG-4 level, before network processing (in a more general point of view, if said encapsulation is done at the MPEG-4 level, networks such as ATM, which do not have any adaptation, can be handled). As shown in FIG. 3, that illustrates an example of stuffing for an MPEG-2 TS packet, an Access Unit is segmented in order to produce AL-PDUs, each of which is tagged with an AL-PDU header indicating time and configuration parameters. The last packet fitting not a network packet (one MPEG-2 TS packet=188 bytes), a padding packet, made of padding bytes only, is added to the last segment of the Access Unit (in this case, a packet of 25 bytes). It can then be seen that the addition of the following parts: the padding packet (25 bytes), the AL-PDU header of said padding packet (1 byte), the associated FM-PDU header (2 bytes: 1 for the FlexMux Channel number FMC, 1 for the length fields LEN), and the successive similar parts of the last packet (payload 2=150 bytes; AL-PDU header=4 bytes; FM-PDU header=2 bytes; TS header=4 bytes) indeed gives the length (=188 bytes) of an MPEG-2 TS packet.

Figure 4:
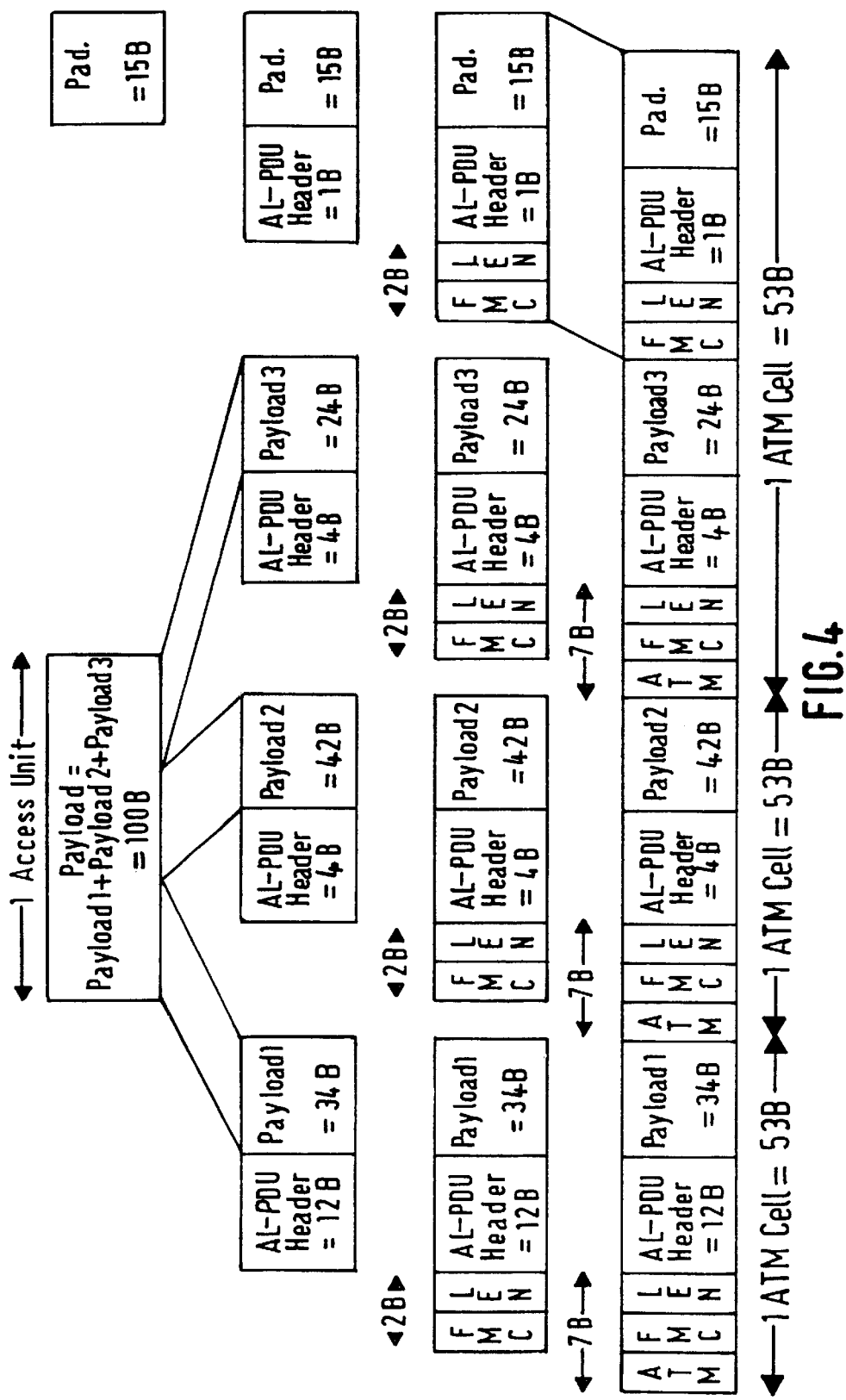

While FIG. 3 shows a mechanism of encapsulation with padding bytes in the context of MPEG-2 TS, FIG. 4 shows a similar mechanism in the context of ATM, with a padding packet of 15 bytes (in this example) and an ATM header of 5 bytes. In both cases, the packets are built as indicated hereunder:

network packet=network header (TS, ATM)+network payload;

network payload=FM-PDU;

(3) FM-PDU=FM-PDU header+FM-PDU payload;

(4) FM-PDU payload=AL-PDU (5) AL-PDU=AL-PDU header+AL-PDU payload;

(6) AL-PDU payload=1 segment of Access Unit (7) Access Unit=(segments of Access Unit), the last one being generally too small to fit the constant packet size associated to the considered network.

Figure 5:
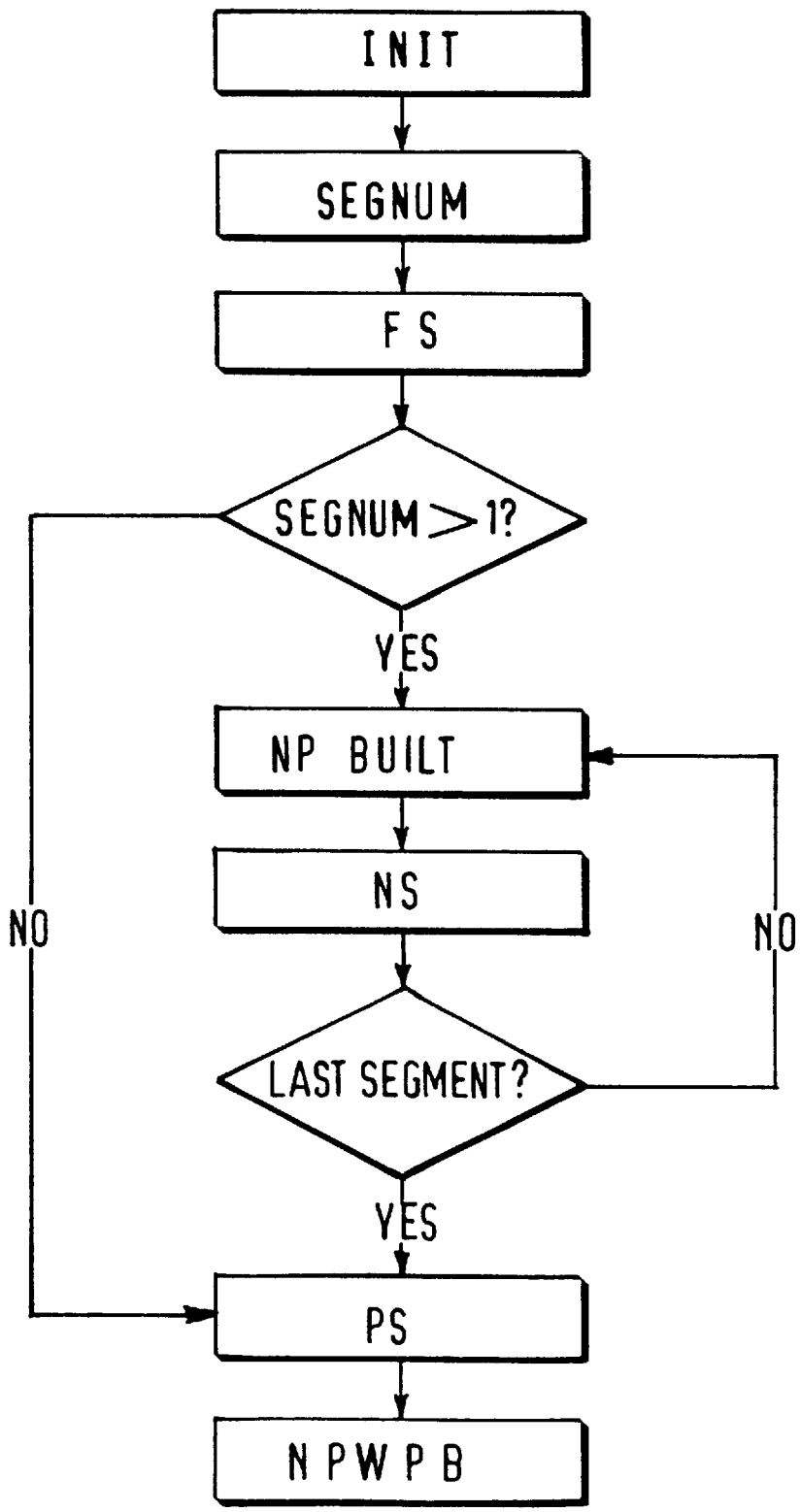
FIG. 5 illustrates a computing process used when carrying out the invention.

Either for MPEG-2 TS or for ATM, the size of the padding packet has to be computed. A computing method of said size is illustrated in FIG. 5 and comprises the following sub-steps:

after initialization of the computing process (INIT), the number of segments SEGNUM in the Access Unit is detected;

the first segment FS is made available, and the number of segments is examined (SEGNUM>1 ?);

if said number is greater than 1 (reply YES to SEG-NUM>1 ?), the network packet corresponding to said first segment is built (NP BUILT), by addition of the appropriate headers corresponding to the concerned transport network, and the next segment NS is made available:

if said next segment is not the last one (reply NO to LAST SEG ?) a feedback connection allows to form a loop for similarly building the network packet corresponding to said next segment (NP BUILT), and so on;

on the contrary, if said segment is the last one (reply YES to LAST SEG ?), the padding size PS is computed, by difference between the size of this last segment and the size of the network packet and taking into account the values of the different headers;

if the number SEGNUM is not greater than 1 (reply no to SEGNUM>1 ?), the padding size ps for the single segment is computed as indicated in the previous step;

as soon as the padding size has been computed, the corresponding complete network packet with padding bytes is built (this packet is designated by NPWPB) and now fits the size of the packets of the concerned network.

What is claimed is:

1. A method of encapsulation of data into network transport packets of constant size, said data being organized in successive, individually accessible portions of coded representations of audio-visual objects and each of said portions being sub-divided into segments, said method being characterized in that it comprises, for matching the last segment of each portion to the constant size of the transport packets, a padding step provided for adding a specific padding packet to each of said last segments, wherein the size of the padding packet of each successive portion is computed according to the following sub-steps:

the number of segments of each portion is detected and examined;

if said number is greater than 1, each successive network packet of constant size is built by adding to each segment except the last one appropriate headers, corresponding to the concerned transport network, and the size of the padding packet is then computed by difference between the size of the last segment and the size of the network packets and taking into account the values of said headers;

if said number is not greater than 1, the size of the padding packet is computed by difference between the size of the single segment and the size of the network packets and taking into account the values of said headers;

based on that size of the padding packet, the last complete network packet corresponding to said last or single segment is built.

2. A method according to claim 1, wherein said data are multimedia data of the MPEG-4 type and each of said portions, called Access Unit or AU, is sub-divided into segments called Access Unit layer-Packet Data Units, or AL-PDUs.

* * * * *